United States Patent
Uluyol

(10) Patent No.: US 9,702,346 B2
(45) Date of Patent: Jul. 11, 2017

(54) SYNCHRONIZING DATA FROM IRREGULARLY SAMPLED SENSORS

(71) Applicant: Onder Uluyol, Fridley, MN (US)

(72) Inventor: Onder Uluyol, Fridley, MN (US)

(73) Assignee: Honeywell International Inc., Morris Plains, NJ (US)

(*) Notice: Subject to any disclaimer, the term of this patent is extended or adjusted under 35 U.S.C. 154(b) by 949 days.

(21) Appl. No.: 13/737,759

(22) Filed: Jan. 9, 2013

(65) Prior Publication Data

US 2014/0195199 A1     Jul. 10, 2014

(51) Int. Cl.
    *G06F 7/00*     (2006.01)
    *F03D 7/04*     (2006.01)
    *G05B 23/02*     (2006.01)

(52) U.S. Cl.
    CPC ......... *F03D 7/048* (2013.01); *G05B 23/0221* (2013.01); *F05B 2260/80* (2013.01); *G05B 2219/2619* (2013.01); *Y02E 10/723* (2013.01)

(58) Field of Classification Search
USPC ........................................... 702/189
See application file for complete search history.

(56) References Cited

PUBLICATIONS

Jayakrishnan Unnikrishnan, Sampling and Reconstruction of Spatial Fields using Mobile Sensors, 2012 IEEE., pp. 1-13.*

* cited by examiner

*Primary Examiner* — Tung Lau
(74) *Attorney, Agent, or Firm* — Schwegman Lundberg & Woessner, P.A.

(57) ABSTRACT

A system and method include receiving a set of sampled measurements for each of multiple sensors, wherein the sampled measurements are at irregular intervals or different rates, re-sampling the sampled measurements of each of the multiple sensors at a higher rate than one of the sensor's set of sampled measurements, and synchronizing the sampled measurements of each of the multiple sensors.

9 Claims, 8 Drawing Sheets

| Case No | Case Description | No of Samples |
|---|---|---|
| Orig | Complete 1-min re-sampled data | 85074 |
| 1 | Filtered for Dire 1 sigma in [0,10] - stable wind | 52182 |
| 2 | Filtered for Dire 1 sigma in [0,10] - stable wind | 60205 |
| 3 | Filtered for Dire 1 sigma in [90,180] - unstable wind | 5186 |
| 4 | Filtered for Dire 1 sigma in [90,180] - unstable wind | 7282 |
| 5 | Filtered for no power [<50] | 14553 |
| 6 | Filtered for power in [50,250] - low power | 20699 |
| 7 | Filtered for power in [250,1250] - broad mid range | 30899 |
| 8 | Filtered for power in [1250,1500] - high power | 10418 |
| 9 | Filtered for excess power [>1500] | 114046 |
| 10 | Filtered for nominal variation in power [sigma in 50,300] - broad mid range | 65140 |
| 11 | Filtered for no wind [<4] | 4800 |
| 12 | Filtered for operating wind speed in [4,15] | 76441 |
| 13 | Filtered for excess wind speed in [>15] | 3833 |
| 14 | Filtered for nominal variation in wind speed [<1.3 sigma] | 75649 |
| 15 | Filtered for faulted (any 7 WTs) | 9 |
| 16 | Filtered for operating (any 7 WTs) | 0 |
| 17 | Filtered for state_fault (any 7 WTs) | 1012 |
| 18 | Filtered for sum_ice_detection in [78,155] (more than half WTs) | 64 |
| 19 | Filtered for sum_ext_p_limit in [140,155] (more than 90% of WTs) | 1158 |

FIG. 7

| No | Case Description | Filter Combination | Samples | Fault Found (Y/N) |
|---|---|---|---|---|
| 1 | Stable wind | F1*F2 | 42364 | Yes |
| 2 | Stable power | F7*F10 | 27296 | No |
| 3 | Stable power in nominal wind | F7*F10*F12*F14 | 26620 | No |
| 4 | Stable power in nominal and stable wind | F1*F2*F7*F10*F12*F14 | 13851 | No |
| 5 | Stable power in nominal and stable wind with no fault | F1*F2*F7*F10*F12*F14*F15 | 13851 | No |
| 6 | Stable power in nominal and stable wind with no ice | F1*F2*F7*F10*F12*F14*F18 | 13851 | No |
| 7 | Nominal wind | F12*F14 | 69022 | Yes |
| 8 | Stable power in nominal and stable wind with no state fault | F1*F2*F7*F10*F12*F14*F17 | 13735 | No |
| 9 | Stable power in nominal and stable wind with no ext power limit | F1*F2*F7*F10*F12*F14*F19 | 13558 | No |
| 10 | Most clean case: Stable power in nominal and stable wind with no fault, no ice, no ext power limit | F1*F2*F7*F10*F12*F14*F15-F17-F18-F19 | 13442 | No |
| 11 | Unstable wind | F3*F4 | 3756 | Yes |
| 12 | Too low or too high power | F6+F8+F9 | 42403 | Yes |
| 13 | Has either fault, or state fault, or ice, or ext power limit | F15+F17+F18+F19 | 2224 | Yes |
| 14 | Nominal or high wind | F12+F13 | 80274 | Yes |
| 15 | Unstable wind, too low or too high power, nominal or high wind, but no known fault | F3*F4*(F6+F8+F9)*(F12+F13) | 1425 | Yes |
| 16 | Most extreme case: Unstable wind, too low or too high power, nominal or high wind, Has either fault, or state fault, or ice, or ext power limit | F3*F4*(F6+F8+F9)*(F12+F13)*(F15+F17+F18+F19) | 18 | Yes |
| 17 | Most extreme case: Unstable wind, too low or too high power, nominal or high wind, Has either fault, or state fault, or ice, or ext power limit, and excessive power variation | F3*F4*(F6+F8+F9)*(F12+F13)*(F15+F17+F18+F19)-F10 | 5 | Yes |
| 18 | Most extreme case: Unstable wind, too low or too high power, nominal or high wind, Has either fault, or state fault, or ice, or ext power limit, and excessive power and wind variation | F3*F4*(F6+F8+F9)*(F12+F13)*(F15+F17+F18+F19)-F10-F14 | 0 | N/A |

FIG. 8

SYNCHRONIZING DATA FROM IRREGULARLY SAMPLED SENSORS

GOVERNMENT FUNDING

This invention was made with Government support under Grant Number DE-EE0001368 awarded by the Department of Energy. The United States Government has certain rights in the invention.

BACKGROUND

In large industrial process or power production systems distributed measurement and control approaches are used. Various dynamics are monitored within each subsystem using different sampling modes and sampling rates. It is difficult to develop, test and deploy plant wide control and condition monitoring analytics for such complex systems, especially with disparate sets of data.

SUMMARY

A system, computer readable storage device and method include receiving a set of sampled measurements for each of multiple sensors, wherein the sampled measurements are at irregular intervals or different rates, re-sampling the sampled measurements of each of the multiple sensors at a higher rate than one of the sensor's set of sampled measurements, and synchronizing the sampled measurements of each of the multiple sensors.

In further embodiments, sampled measurements are used to filter re-sampled measurements. The sampled measurements may include sampled measurements from multiple sensors that are logically combined to form the filter.

BRIEF DESCRIPTION OF THE DRAWINGS

FIG. 7 is a table illustrating cases having various filters according to an example embodiment.

FIG. 8 is a table illustrating cases having multiple logically combined samples from multiple sensors according to an example embodiment.

DETAILED DESCRIPTION

Figure 1A:
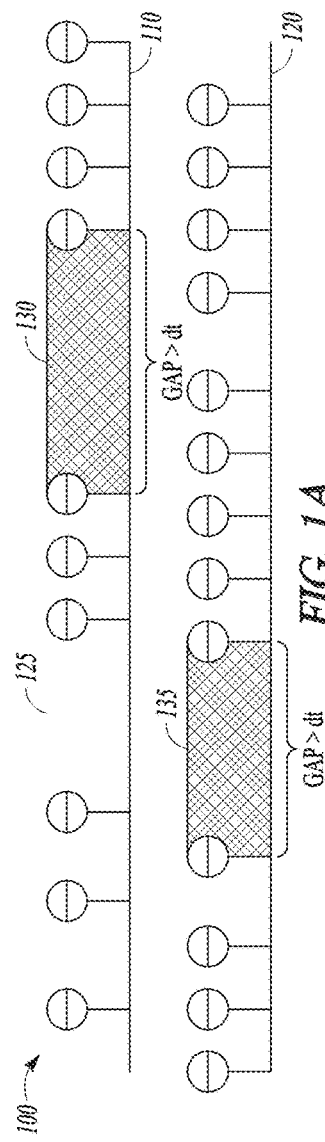
FIG. 1A is a graph showing sample measurements at irregular times of multiple sensors according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, disparate sets of data corresponding to historical sensor readings in industrial control processes need to be resampled and temporally aligned in order to successfully develop, test, and deploy plant wide control and condition monitoring analytics.

Resampling and aligning data may be accomplished by the maximum use of the original data in the common data set while allowing individual sensor signals their unique configurations for interpolation and re-sampling of the misaligned or missing data points. The approach in one embodiment involves a high frequency re-sampling and a low frequency re-sampling steps. First, each sensor signal is analyzed for their noise and sampling characteristics. Most common sampling periods are identified, and the signals are re-sampled using a nearest neighbor or other linear or non-linear interpolation methods.

Based on the rate of change of each signal, the maximum allowable gaps in the data are determined. The gaps that are larger than the maximum allowable are combined for all sensors to form dead zones in the common data set. The re-sampled data points that fall in the dead zones are removed from the set. Next, for the remaining data points, a low frequency sampling rate that is common to all sensors and is suitable for the analytic development and testing is determined.

In order to assure that statistically significant and valid samples are generated, a requirement for a minimum number of samples is imposed on the high frequency samples that fall in the low frequency sampling intervals. Finally all sensors are interpolated at the common and equally distributed intervals and other statistical metrics are computed.

Besides regularly sampled signals, the analytic development prefers that the available data to be segmented in various ways to delineate it for training, testing, and validation purposes, and filtering of the data for different phases and operational conditions of the system. Similar to the re-sampling of sensor signals that are used for modeling the system, the sensors that are used for filtering need to be re-sampled at the same time instances. After the re-sampling, relevant criteria is applied to the filtering signal to extract the corresponding sensor data. Individual filters can also be combined to generate composite filters. Each one of the data slices produced by applying the individual or composite filters constitutes a test case for the analytic development and validation.

FIG. 1A is a time graph 100 showing raw historical measurements at irregular intervals for two sensors at 110 and 120. The data is an example, and shows multiple gaps in the measurements indicated at 125, 130, and 135. As can be observed, the sensor data 110 is sampled somewhat irregularly in time and includes two gaps, 125 and 130. Gap 125 is representative of an expected gap given the sampling rate of the sensor, and may be representative of the data not changing between samples of the sensor, so no data was reported in that gap. Gap 130 is longer than a maximum gap for the data and represents lack of data for the time period corresponding to the gap. Data for sensor 120 was sampled at a faster irregular rate, and contains gap 135, also representing a gap longer than a maximum gap for that sensor.

Samples of various sensors may be obtained at different rates and irregularity due to the different parameters that are sensed. These parameters may change at different rates. For instance, in wind energy farm, turbine speed may change quite frequently, and may therefore having a higher sampling rate resulting in more samples for any selected period than are needed from an ambient temperature sensor, since temperature changes more slowly.

Figure 1B:
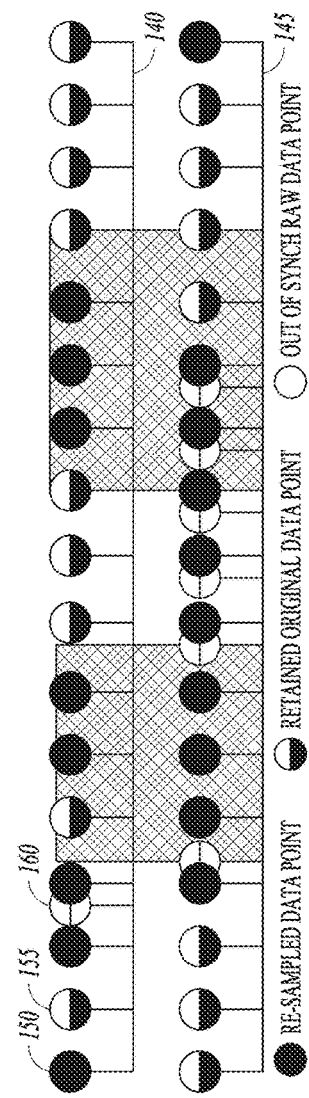
FIG. 1B is a graph showing re-sampled measurements at a higher frequency according to an example embodiment.

FIG. 1B illustrates a high frequency re-sampling of the data for the same two sensors 110 and 120 as illustrated at 140 and 145 respectively. Different kinds of samples are illustrated with a solid circle such as solid circle 150 corresponding to a re-sampled data point, half of a solid circle, such as circle 155 representing a retained original data point, and non-solid circles 160 indicative of out of synch raw data points. Each of the sensor high frequency sampling in this example has at least one of each type of sample in this embodiment. In further embodiments, more sensors may be included in the sampling, and not all types of samples need be represented for each sensor. The rows are looked at separately, and original data points are kept.

Figure 1C:
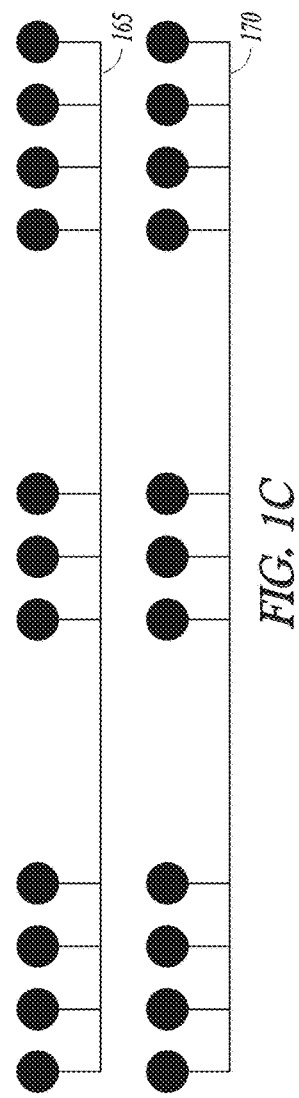
FIG. 1C is a graph showing synchronized re-sampled measurements according to an example embodiment.

FIG. 1C represents final sampled data streams for the sensors at 165, 170 where samples for each sensor are synchronized and time aligned. The streams 165 and 170 each contain the same number of samples and gaps. The gaps correspond to where at least one sensor has a gap that exceeds an acceptable time between samples. This ensures that only valid data for all the sensors is time aligned and synchronized. While there may be valid data for one or more sensors in a time period, a gap in samples for one sensor will result in such valid data not being used. Thus, available data is provided for algorithms from time periods common to all the sensors.

Figure 2:
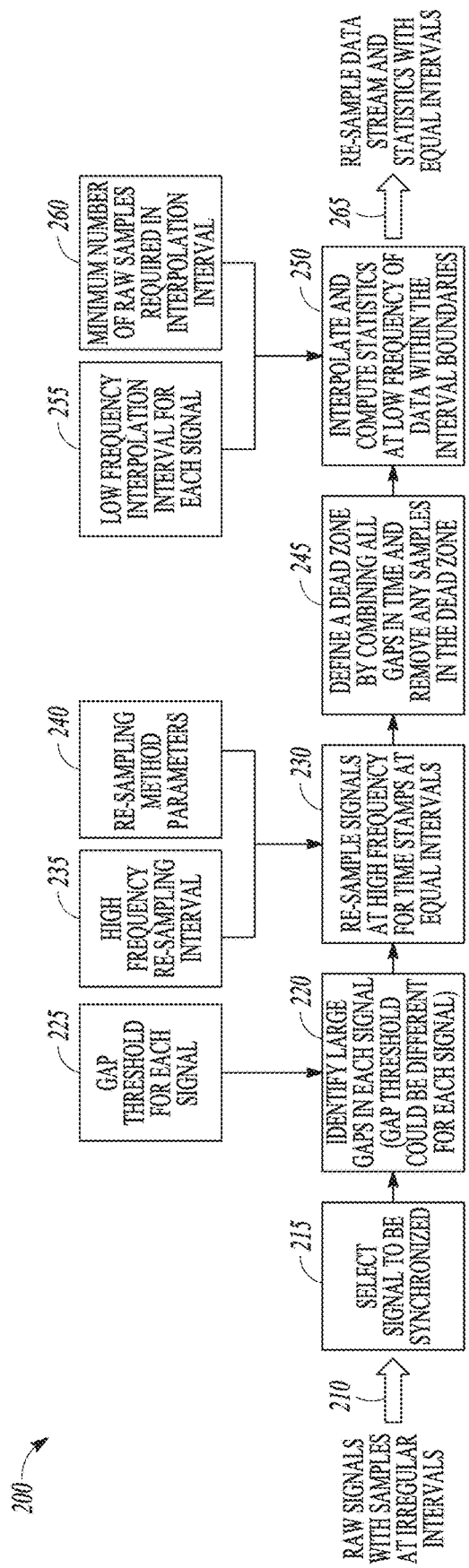
FIG. 2 is a block flow diagram illustrating a method of re-sampling and synchronizing measurements according to an example embodiment.

A block flow diagram in FIG. 2 illustrates a method 200 to resample and synchronize signals. Raw signals with samples at irregular intervals are provided at 210. At 215, signals are selected to be synchronized. At 220, large gaps in each signal are identified based on a gap threshold 225 for each signal. The gap threshold may be different for each signal. Such differences may be based on expected change rates of various parameters that were measured.

At 230, signals are resampled at a high frequency for time stamps at equal intervals based on a high frequency resampling interval 235 and selected resampling parameters 240. Various methods of resampling may be used. For one method where data is already available at a higher sampling rate than needed, samples may be combined to provide an average over a sample interval. If not enough samples are available as defined by a sample threshold defined in resampling parameters 240, then the samples are not used. At 245, dead zones are defined by combining all gaps in time and removing samples from each signal in the dead zones. At 250, data within the interval boundaries may be interpolated, and statistics may be computed for low frequency data.

A low frequency interpolation interval for each signal is defined at 255, and a minimum number of raw samples for the interpolation interval is provided at 260. Interpolation may be performed to define a sample at specific points in time that is the same for all sets of signals. In its simplest form, the average of two signals on either side of a point in time are used. In other embodiments, samples may be fit to a curve or straight line, with the value at the desired point in time taken from the curve or line. The result is a resampled data stream and statistics with equal intervals at 265.

Figure 3:
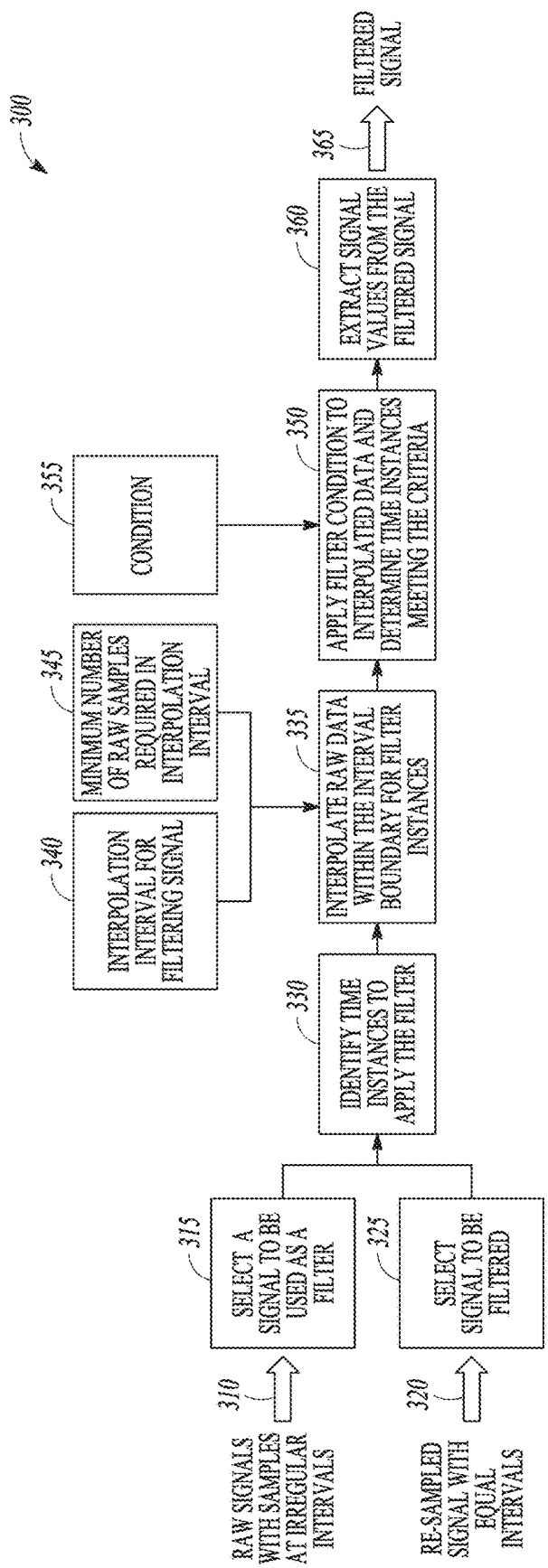
FIG. 3 is a block flow diagram illustrating a method of filtering re-sampled measurements according to an example embodiment.
Figure 4:
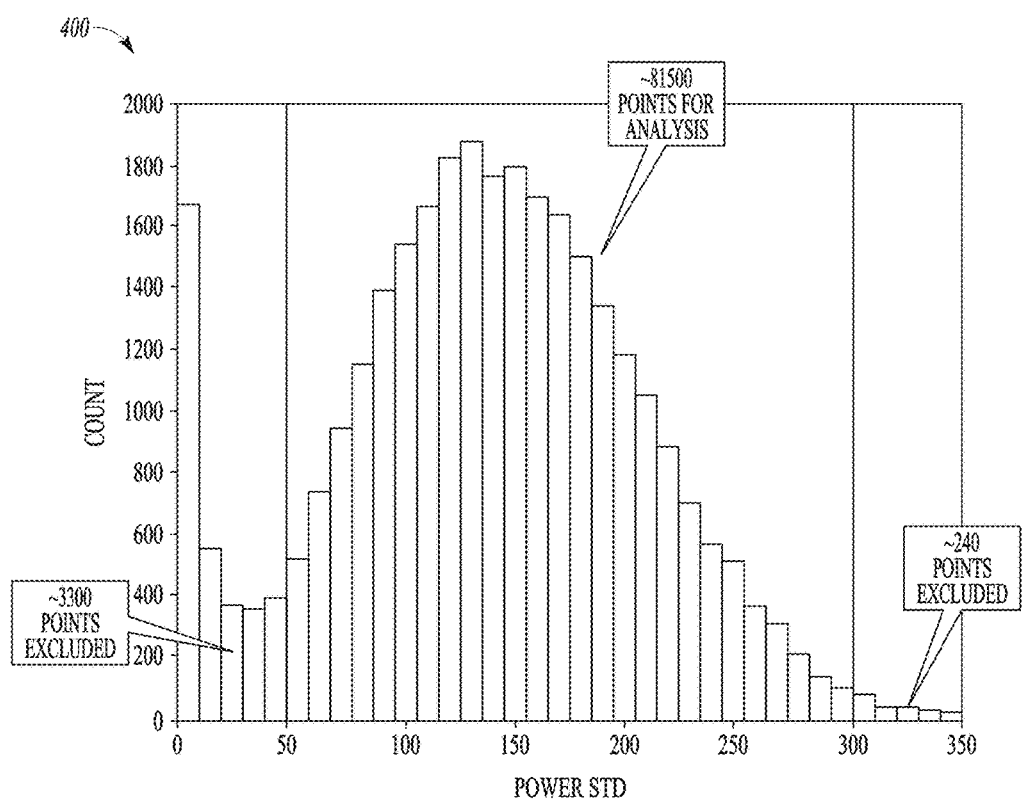
FIG. 4 is a graph illustrating filtering for variation in power of wind turbines according to an example embodiment.

A method of filtering is shown at 300 in a block flow diagram in FIG. 3. Raw signals with samples at irregular intervals 310 are provided to a block 315 which selects a signal to be used as a filter. The resampled signal at 320 is provided to block 325 which may select a signal to be filtered. The selected filter and signal to be filtered are provided to identify time instances to apply the filter at 330. In one example, data from a second sensor may be used only when data from the first sensor is between two values, or lower or higher than a value. Many other filters may be used, including combinations of filters as described below. At 335, raw data is interpolated within the interval boundary for filter instances utilizing an interpolation interval for the filtering signal 340 and a minimum number of raw simples required in the interpolation interval defined at 345.

At 350, a filter condition 355 is applied to interpolated data and time instances meeting the criteria are determined. Signal values are extracted from the filtered signal at 360 and the filtered signal is provided at 365.

A graph 400 illustrates one example of data filtering showing variation in power for a wind turbines. The example shows 81500 points for power variation analysis with approximately 240 points excluded for values over 300 kW, and approximately 3300 points excluded for power levels below 50 kW in sigma. Such values may correspond to inoperable or incorrectly operating wind turbines. A low variation may indicate curtailment and a high variation may indicate several wind turbines behaving anomalously compared to the group.

Figure 5:
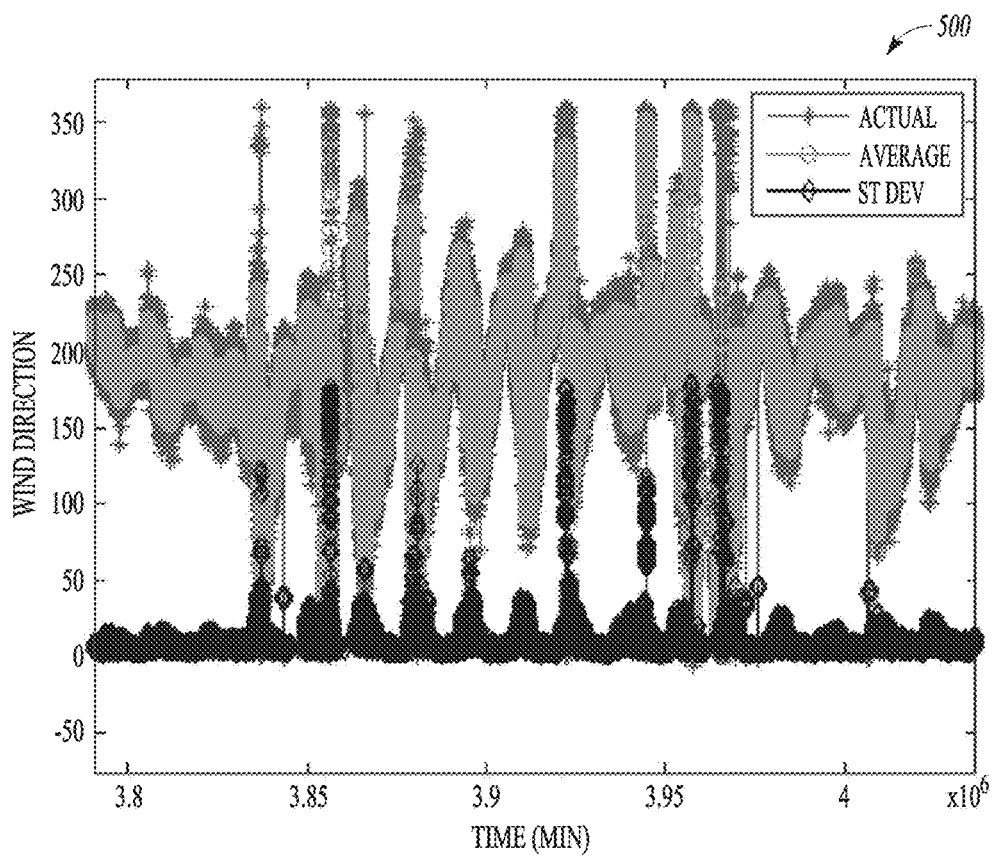
FIG. 5 is a chart illustrating periods of stable wind direction according to an example embodiment.
Figure 6:
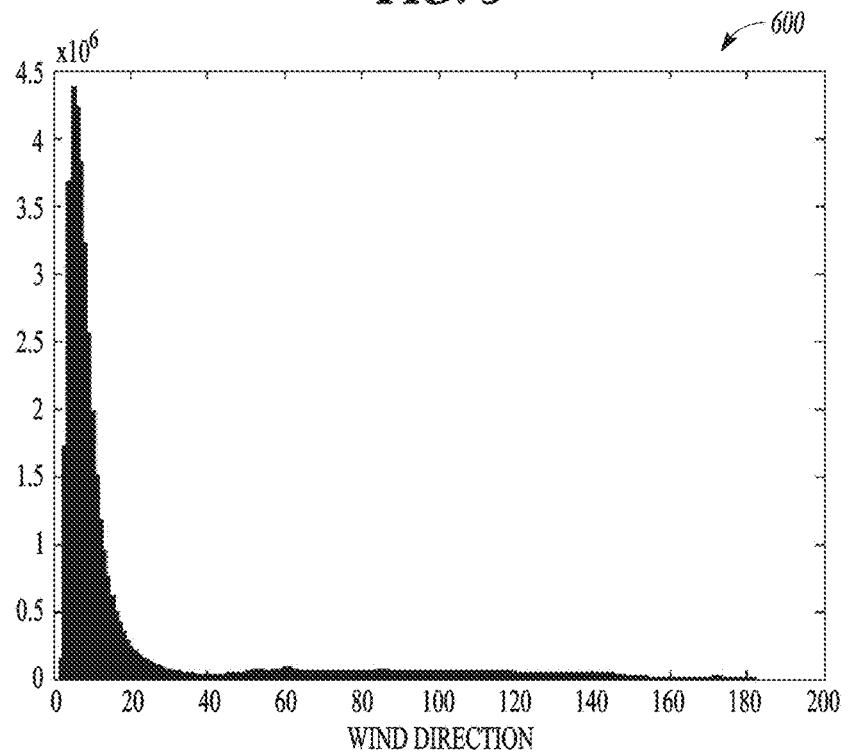
FIG. 6 is a chart illustrating a number of samples versus wind direction according to an example embodiment.

A further example of a filter relates to seeking periods of stable wind direction as illustrated in graph form in FIG. 5 at 500 showing wind direction versus time. Statistics such as actual, average and standard deviation for the measured wind direction are shown in the graph according to the key. The example object of the filter is to seek periods of stable wind direction, including computing direction, average and standard deviation. Three minutes are scanned around each sample. A minimum of 20 samples is set. Variation in wind direction is generally limited to less than a standard deviation of 20 degrees within a three minute period. A cut off at standard deviation of 10 degrees filters 55% of the data in a first direction1, and 65% of data in a second direction 2, as illustrated at 600 in a graph of FIG. 6 showing a number of samples versus the variation in wind direction.

FIG. 7 is a table illustrating at 700 multiple different examples of single filters and results on an example data set. 19 cases are shown in column 705 with a case description of the filter used in column 710 and the number of resulting samples in column 715. The first line shows 85074 samples in one minute resampled data. Case number one shows a filter for wind direction having sigma between 0 and 10, representative of stable wind. 52182 samples met the filter criteria. Some other examples from the table include unstable wind from two different directions, various power levels, wind speeds, faults, operating, and ice conditions. The types of single filters that may be applied are very flexible. One use for such filters is to detect the periods of anomalous behaviors of monitored equipment.

FIG. 8 is a table illustrating at 800 different example filters using logical symbols to combine filters. The logical symbols include "*" for logical AND, "+" for OR, and "−" for NOT. Column 805 includes case numbers and column 810 includes case descriptions. Filter combinations are shown in column 815, samples in column 820, and whether or not a fault was detected by the monitoring system is shown in column 825. Case number 1 shows a filter combination to determine if wind is stable, using a filter combination of filter 1 AND filter 2. The filters may correspond to any sampled data selected in the data set. Another more complex filter example is shown in example 15, unstable wind, too low or too high power, nominal or high wind, but no known fault is defined by the filter combination of: F3*F4*(F6+F8+F9)*(F12+F13). Four logical statements are ANDed together, with two of the statements being ORs of two (F12+F13) and three (F6+F8+F9) filters and the other two statement being filters F3 and F4. Even more complex examples are shown in cases 16-18. Case number 18 did not result in any samples being found.

Figure 9:
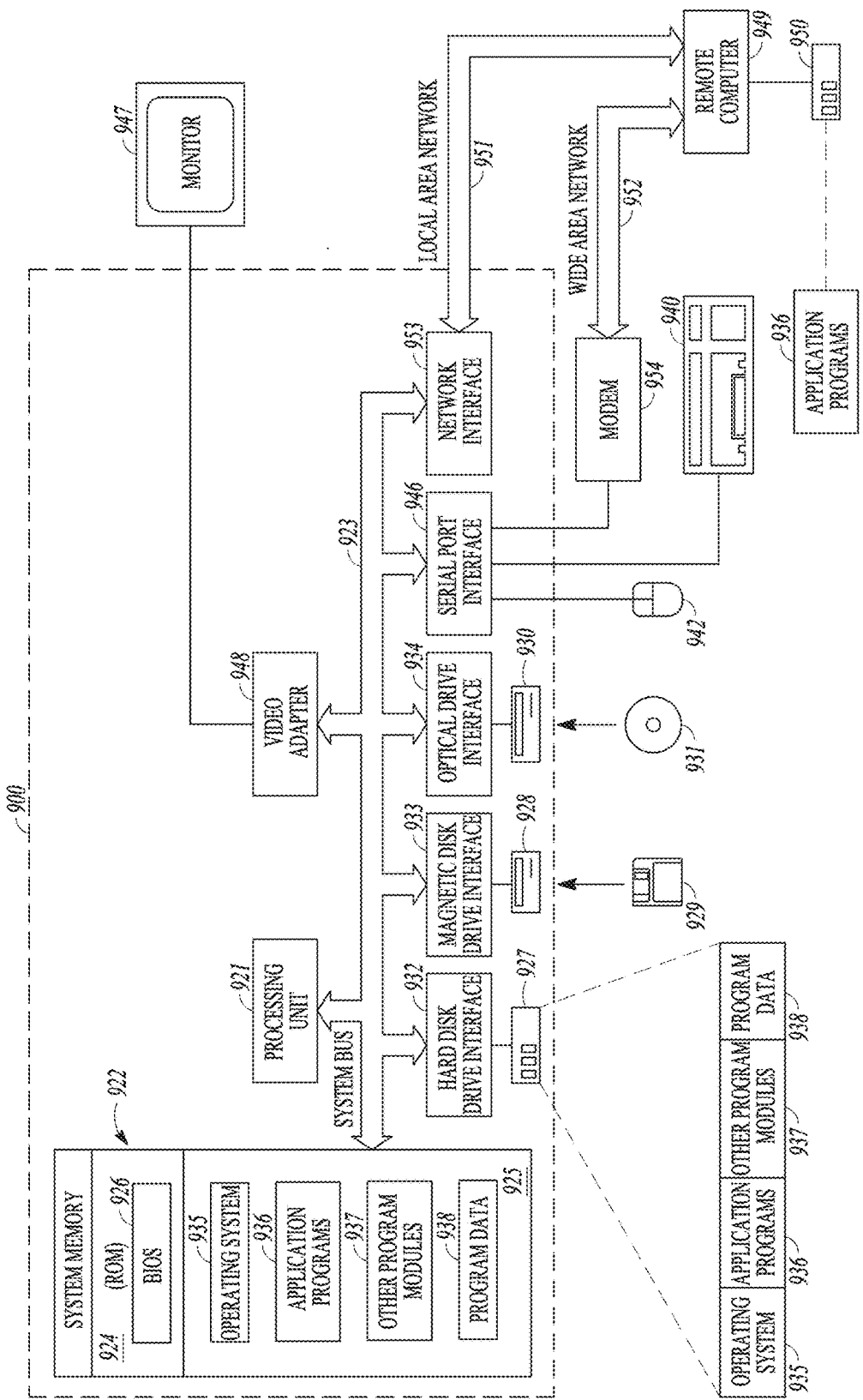
FIG. 9 is a block diagram of an example computer system for implementing one or more methods according to an example embodiment.

FIG. 9 is a block diagram of a computer system to implement methods according to an example embodiment. In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the example operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; the invention is not limited to a particular type of communications device. The remote computer 949 can be another computer, a server, a router, a network PC, a client, a peer device or other common network node, and typically includes many or all of the elements described above I/O relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are an example and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
receiving a set of sampled measurements for each of multiple sensors, wherein the sampled measurements are at irregular intervals or different rates;
re-sampling the sampled measurements of each of the multiple sensors at a higher rate than one of the sensor's set of sampled measurements; and
synchronizing the sampled measurements of each of the multiple sensors.

2. The method of example 1 wherein re-sampling the sampled measurements includes removing samples for each of sets of sampled measurements for the sensors where a gap occurs in one sensor's set of sampled measurements.

3. The method of any of examples 1-2 wherein a gap is defined as a time period that exceeds a threshold set for the sensor without a sampled measurement.

4. The method of any of examples 1-3 wherein synchronizing the sampled measurements comprises combining measurements to obtain values at each of equal time intervals.

5. The method of any of examples 1-4 wherein synchronizing the sampled measurements comprises interpolating measurements to obtain values at time stamps separated by equal time intervals.

6. The method of example 5 wherein an average of at least two measurements is used to obtain a value for a time stamp between the times of the two measurements.

7. The method of any of examples 1-6 and further comprising using samples from a first sensor to filter re-sampled values corresponding to a second sensor.

8. The method of any of examples 1-7 and further comprising combining samples from multiple sensors to filter re-sampled values corresponding to a sensor.

9. The method of example 8 wherein the sampled values from multiple sensors are combined using logical operators including AND, OR, and NOT.

10. A computer readable storage device having recorded instructions for causing a computer to implement a method, the method comprising:
receiving a set of sampled measurements for each of multiple sensors, wherein the sampled measurements are at irregular intervals or different rates;
re-sampling the sampled measurements of each of the multiple sensors at a higher rate than one of the sensor's set of sampled measurements; and
synchronizing the sampled measurements of each of the multiple sensors.

11. The computer readable storage device of example 10 wherein re-sampling the sampled measurements includes removing samples for each of sets of sampled measurements for the sensors where a gap occurs in one sensor's set of sampled measurements.

12. The computer readable storage device of any of examples 10-11 wherein a gap is defined as a time period that exceeds a threshold set for the sensor without a sampled measurement.

13. The computer readable storage device of any of examples 10-12 wherein synchronizing the sampled measurements comprises combining measurements to obtain values at each of equal time intervals.

14. The computer readable storage device of any of examples 10-13 wherein synchronizing the sampled measurements comprises interpolating measurements to obtain values at time stamps separated by equal time intervals.

15. The computer readable storage device of example 14 wherein an average of two measurements is used to obtain a value for a time stamp between the times of the two measurements.

16. The computer readable storage device of any of examples 10-15 and further comprising using samples from a first sensor to filter re-sampled values corresponding to a second sensor.

17. The computer readable storage device of any of examples 10-16 and further comprising combining samples from multiple sensors to filter re-sampled values corresponding to a sensor, wherein the sampled values from multiple sensors are combined using logical operators including AND, OR, and NOT.

18. A system comprising:
a processor programmed to receive a set of sampled measurements for each of multiple sensors, wherein the sampled measurements are at irregular intervals or different rates;
wherein the processor is programmed to further re-sample the sampled measurements of each of the multiple sensors at a higher rate than one of the sensor's set of sampled measurements; and
wherein the processor is further programmed to synchronize the sampled measurements of each of the multiple sensors.

19. The system of example 18 wherein re-sampling the sampled measurements includes removing samples for each of sets of sampled measurements for the sensors where a gap occurs in one sensor's set of sampled measurements, and wherein a gap is defined as a time period that exceeds a threshold set for the sensor without a sampled measurement, and wherein the processor is programmed to synchronize the sampled measurements by interpolating measurements to obtain values at time stamps separated by equal time intervals.

20. The system of any of examples 18-19 wherein the processor is further programmed to use samples from a first sensor to filter re-sampled values corresponding to a second sensor.

Although a few embodiments have been described in detail above, other modifications are possible. The phrase "irregular intervals or different rates" is meant to cover either or both irregular intervals and different rates. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving, at a programmed computer, a set of sampled measurements comprising original data points for each of multiple sensors monitoring an industrial process during an original time period, wherein the set of sampled measurements were sampled at irregular intervals resulting in the original data points for each of the multiple sensors being unsynchronized between the multiple sensors;

re-sampling, via the programmed computer, the set of received sampled measurements of each of the multiple sensors at a higher rate than at least one of the multiple sensors, the re-sampling including:

synchronizing, via the programmed computer, the set of received sampled measurements of each of the multiple sensors, wherein synchronizing includes identifying new common instances of time during the original time period for the multiple sensors; and interpolating, via the programmed computer, data points for each of the multiple sensors at the new common instances of time where no original data point exists for the set of synchronized sampled measurements.

2. The method of claim 1 wherein re-sampling the sampled measurements includes removing sampled measurements for each of sets of sampled measurements for the sensors where a gap occurs in one sensor's set of sampled measurements.

3. The method of claim 1 wherein a gap is defined as a time period that exceeds a threshold set for the sensor without a sampled measurement.

4. The method of claim 1 wherein synchronizing the sampled measurements comprises combining measurements to obtain values at each of equal time intervals.

5. The method of claim 1 wherein synchronizing the sampled measurements comprises interpolating measurements to obtain values at time stamps separated by equal time intervals.

6. The method of claim 5 wherein an average of at least two measurements is used to obtain a value for a time stamp between the times of the two measurements.

7. The method of claim 1 and further comprising using sampled measurements from a first sensor to filter re-sampled values corresponding to a second sensor.

8. The method of claim 1 and further comprising combining sampled measurements from multiple sensors to filter re-sampled values corresponding to a sensor.

9. The method of claim 8 wherein the industrial process monitored by each of the multiple sensors includes a wind turbine industrial process.

\* \* \* \* \*